UNITED STATES PATENT OFFICE.

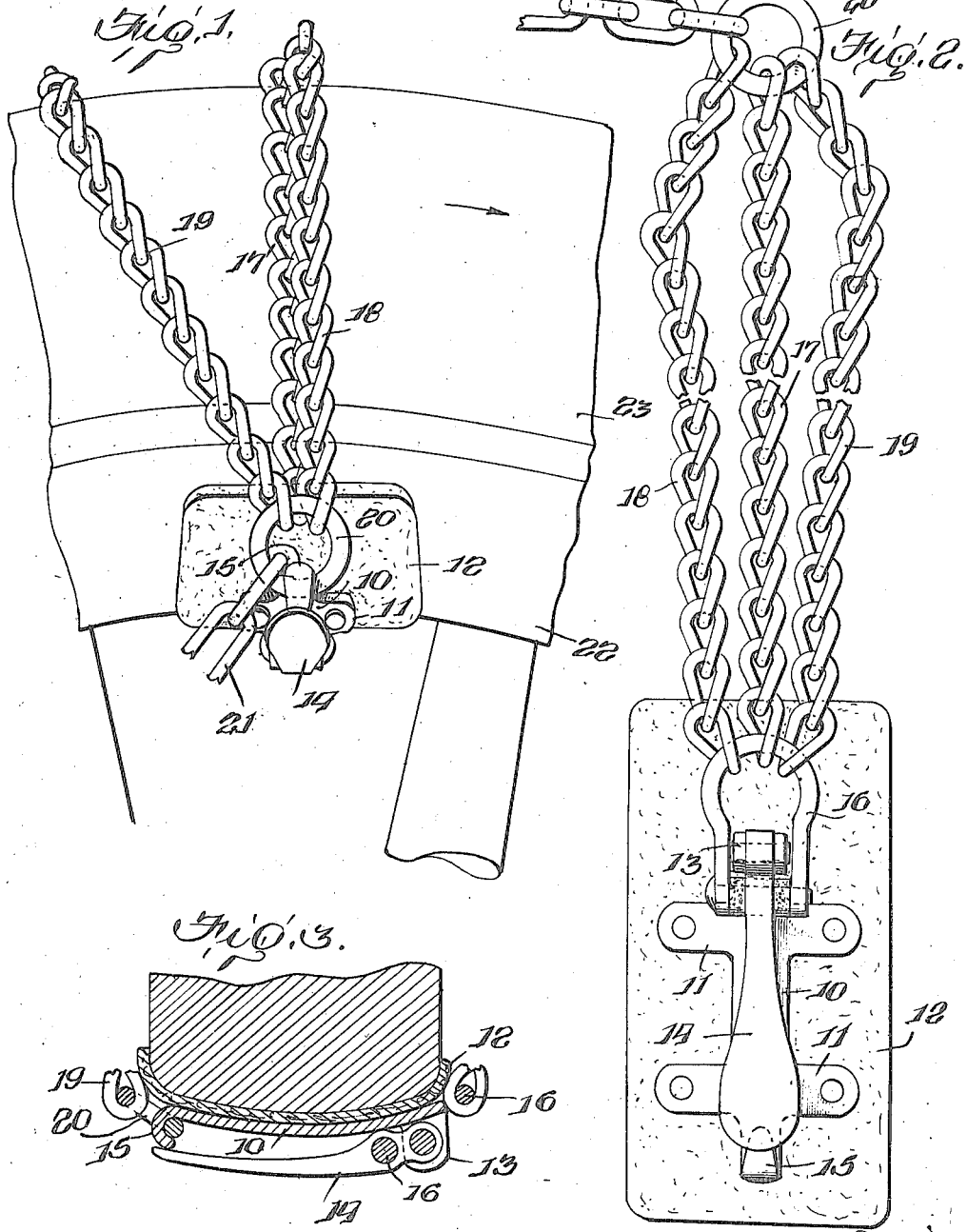

ALFRED HONS, OF BERWICK, PENNSYLVANIA.

EMERGENCY MUD OR NON-SKID DEVICE.

1,255,534.          Specification of Letters Patent.     Patented Feb. 5, 1918.

Application filed October 14, 1916. Serial No. 125,681.

*To all whom it may concern:*

Be it known that I, ALFRED HONS, a citizen of the United States, residing at Berwick, in the county of Columbia and State of Pennsylvania, have invented certain new and useful Improvements in Emergency Mud or Non-Skid Devices, of which the following is a specification.

This invention relates to an improved emergency mud or non-skid device for motor vehicles and has as its primary object to provide a device of this character which may be readily and easily applied to substantially any conventional type of motor vehicle wheel and provided with chains to overlie the wheel tire for gripping a road surface to prevent skidding of the wheel.

The invention has as a further object to provide an arrangement wherein the chains employed will be of unequal length with either of the outermost chains adapted to roll back over the center chain, depending upon the direction of movement of the wheel, to coöperate with the said center chain for increasing the gripping action of the device.

And the invention has as a still further object to provide an improved arrangement for connecting the device with a wheel and wherein when so attached to the wheel, the said device will be locked against displacement.

Other and incidental objects will appear as the description proceeds and in the drawings wherein I have illustrated the preferred embodiment of the invention and wherein similar reference characters designate corresponding parts throughout the several views:

Figure 1 is a side elevation showing my improved device applied to a conventional type of vehicle wheel with the wheel partly broken away, this view particularly illustrating the manner in which the outermost chains employed are adapted to roll back over the center chain for increasing the gripping action of the chains to the road surface.

Fig. 2 is an elevation showing the device detached and illustrating the relative length of the chains employed, and Fig. 3 is a fragmentary sectional view showing the attaching member for the device and the mounting of the locking lever employed, the free end of this lever being disposed to hold the free ends of the chains against displacement.

In carrying out the invention, the device is formed with an attaching member including a body plate 10 longitudinally curved to conform to the transverse curvature of the inner face of a wheel felly. Extending laterally from the plate 10 adjacent opposite extremities thereof, are pairs of lugs 11 to which is connected a protecting pad or member 12. The pad 12 is preferably formed from a piece of suitable leather although any other approved material may be employed. Formed on the body 10 adjacent one extremity thereof, are outstanding ears 13 between which is pivoted a locking lever 14 movable at its free extremity to seat against a hook 15 formed from the body plate 10 at the adjacent terminal thereof. The purpose of this hook will presently appear.

Pivotally connected with the lever 14 adjacent its inner extremity is a link 16 and connected to this link are a plurality of chains or road gripping elements designated 17, 18, and 19 respectively. The said chains may be of any approved type and any suitable gage and at their free extremities are connected to a ring 20. As particularly shown in Fig. 2 of the drawings, the chain 17 is somewhat shorter than the chains 18 and 19 while the chains 18 and 19 are preferably of equal length.

In Fig. 1 of the drawings, I have shown the manner in which my improved device is applied to a vehicle wheel and for the purposes of illustration, have conventionally shown a portion of a wheel having spokes, a felly 22, and a pneumatic tire 23. The protecting member or pad 12 is seated against the inner face of the felly 22 to extend transversely thereof and it will now be observed that the said pad is of a length to project beneath the link 16. The pad is thus adapted to protect the felly against abrasion or marring of the paint of the wheel. With the pad 12 thus in position to support the attaching member upon the inner side of the felly, the lever 14 is then swung outwardly and the chains 17, 18, and 19 passed around the tire 23 when the ring 20 is then connected with the hook 15 of the body plate 10. The purpose of this hook, therefore, now becomes apparent. The lever 14 is then swung inwardly to draw the chain 18 tightly about the tire and lock the device upon the wheel with the free end of the lever seating against the hook 15. Preferably, one or more links 21 are connected to the ring 20 to provide an adjustable connection between the said ring and the hook 15.

As will now be observed upon reference to Fig. 3 of the drawings, the lever 14 when the device is mounted upon the wheel, will, while providing a means for holding the chains 17, 18 and 19 in active position, also provide a retaining element for the ring 20 with the lever 14 coöperating with the hook 15 to prevent the displacement of the said ring. The device will thus at all times remain securely connected with the wheel.

The chains 18 and 19 being longer than the chain 17, will be free to move around the periphery of the tire 23 with respect to the chain 17 and in Fig. 1 of the drawings, I have shown the manner in which the chains 18 and 19 are adapted to coöperate with the chain 17, for increasing the gripping action of the chains upon a road surface. Assuming the wheel to be turning in the direction of the arrow indicated in Fig. 1, the chain 18 will slip around the tire until the said chain abuts with the chain 17. The chain 18 will then pile up upon the chain 17 to form a ridge about the tread surface of the tire with the combined thickness of the chain forming the said ridge disposed to contact with a road surface to engage therewith and effectually prevent the skidding of the wheel with the chain 19 moved around the tire away from the chain 17 to engage the road surface immediately after the chains 17 and 18 have left the road. Upon the movement of the wheel in the opposite direction, the chain 19 would then, of course, pile up upon the chain 17 in a manner similar to the disposition of the chain 18 shown in Fig. 1 with the chain 18 moved away from the chain 17. Thus, the chains 18 and 19 will coact with the chain 17 without regard to the direction of movement of the wheels, to increase the gripping action of the chains with the road surface.

It will therefore be seen that I provide a highly efficient construction for the purpose set forth and a device which may be readily applied to be securely locked in position.

Having thus described the invention, what is claimed as new is:

1. A device of the character described including an attaching member, and a plurality of flexible road gripping elements carried thereby and adapted to overlie a wheel tire, one of the said elements being shorter than the others with the said last mentioned elements movable to coact with the shorter element.

2. A device of the character described including an attaching member, and a plurality of road gripping elements of unequal length connected with the said member, the attaching member being operable to grip the shorter element about a wheel tire with the other of said elements movable around the tire with respect to said first mentioned element.

3. A device of the character described including an attaching member, a plurality of chains of unequal length each connected at one extremity with the said member, and means connecting the free extremities of the chains and disposed for engagement with said attaching member with the longer chains adapted to coöperate with the shorter chain.

4. A device of the character described including an attaching member, a plurality of chains of unequal length each connected at one extremity with the said member, and a ring connecting the free ends of the chains and disposed for engagement with the attaching member with the said member operable for tightening the shorter chain about a wheel tire.

5. A device of the character described including an attaching member, and a plurality of chains carried thereby and adapted to overlie a wheel tire, one of the said chains being shorter than the others with the said last mentioned chains movable to coact with the shorter chain.

In testimony whereof I affix my signature.

ALFRED HONS. [L. S.]